United States Patent
Hirata et al.

(10) Patent No.: US 7,089,231 B2
(45) Date of Patent: Aug. 8, 2006

(54) SYSTEM AND METHOD FOR SEARCHING A PLURALITY OF DATABASES DISTRIBUTED ACROSS A MULTI SERVER DOMAIN

(75) Inventors: Ken Hirata, Acton, MA (US); Sami M. Shalabi, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 10/334,268

(22) Filed: Dec. 31, 2002

(65) Prior Publication Data

US 2004/0139057 A1 Jul. 15, 2004

(51) Int. Cl.
*G06F 17/30* (2006.01)
(52) U.S. Cl. .................. 707/3; 707/1; 707/4; 715/500; 715/530
(58) Field of Classification Search ...................... None
See application file for complete search history.

(56) References Cited

U.S. PATENT DOCUMENTS

2002/0161745 A1* 10/2002 Call .............................. 707/1
2004/0205473 A1* 10/2004 Fisher et al. ................ 715/500

* cited by examiner

*Primary Examiner*—Jeffrey Gaffin
*Assistant Examiner*—Hassan Mahmoudi
(74) *Attorney, Agent, or Firm*—Stephen T. Keohane; Shelley M. Beckstrand

(57) ABSTRACT

A system is for searching a plurality of project databases, including a service including a plurality of project database servers; a multi server single server signon processor for authenticating access by a user to a plurality of the project databases; a domain catalog server including a native server, a place server and a domain catalog; the native server for receiving from the user a search request and accessing the domain catalog with respect to the search request to obtain URLs for a plurality of documents in the project databases served by project servers configured to the domain catalog to which the user is authenticated and satisfying the search request; and the place server responsive to the URLs for building an XML result tree for responding to the search request.

16 Claims, 10 Drawing Sheets

SYSTEM AND METHOD FOR SEARCHING A PLURALITY OF DATABASES DISTRIBUTED ACROSS A MULTI SERVER DOMAIN

COPENDING U.S. PATENT APPLICATIONS

Ser. No. 10/334,269, filed 31 Dec 2002, entitled "SYSTEM AND METHOD FOR THE AGGREGATION OF PLACE INFORMATION IN A MULTI-SERVER SYSTEM";

Ser. No. 10/334,261, filed 31 Dec 2002, entitled "SYSTEM AND METHOD FOR AGGREGATING USER PROJECT INFORMATION IN A MULTI-SERVER SYSTEM"; and Ser. No. 10/334,296 filed 31 Dec 2002, entitled "SYSTEM AND METHOD FOR CENTRAL REFRESH OF PLACE OBJECTS";

are assigned to the same assignee hereof and contain subject matter related, in certain respect, to the subject matter of the present application. The above identified patent applications are incorporated herein by reference.

BACKGROUND OF THE INVENTION

1. Technical Field of the Invention

This invention relates to database searching. More particularly, it relates to building a search request XML response tree from database URLs distributed across a plurality of servers.

2. Background Art

Characteristic of many computer systems and applications known in the art is the distribution of data to many separate databases. These are often distributed among many servers, and a particular user may have data accessible through a plurality of such servers. In the past, when a user desired to search for data, it was necessary to access each server individually.

In the past, search addressing has been bound to application semantics. Such application semantics require that a single instance of an object in a data store be addressed, even when that data store is duplicated for scalability and reliability. There is a need in the art for a more flexible system and method for dynamically addressing data store searches to accommodate scalability and reliability.

Prior art approaches for searching databases in a domain distributed across a plurality of servers include IBM® Lotus® Domino™ Domain search and Domino Extended search. A problem encountered in these search approaches, referred to as the "static URL addressing problem", results from having tightly coupled server location and object identifier. There is, therefore, a need in the art for a system and method for uncoupling server location and object identifier in order to provide a search access method with improved scalability and reliability characteristics.

Domino, IBM, the IBM Logo, Lotus, Notes, QuickPlace are trademarks of International Business Machines in the United States, other countries, or both.

OBJECTS AND SUMMARY OF THE INVENTION

It is an object of the invention to provide an improved system and method for searching project databases distributed across a plurality of servers.

It is a further object of the invention to provide a system and method which solves the static URL addressing problem.

In accordance with a preferred embodiment of the invention, a method is provided for searching a plurality of project databases by configuring a service to include a plurality of project servers, a domain catalog server, a domain catalog, and a domain catalog server search index; authenticating a user for access to the service; receiving a search request from a user; with reference to the domain catalog, executing a domain search for documents satisfying the search request in all databases within the service to which the user is authenticated; building an XML document tree of URLs to the documents satisfying the search request; and deriving from the XML document tree and returning to the user a list of document URLs satisfying the search request.

In accordance with a preferred embodiment of the invention, a system is provided for searching a plurality of project databases, including a service including a plurality of project database servers; a multi server single server signon processor for authenticating access by a user to a plurality of the project databases; a domain catalog server including a native server, a place server and a domain catalog; the native server for receiving from the user a search result page request and accessing the domain catalog with respect to the search request to obtain URLs for a plurality of documents in said project databases served by project servers configured to the domain catalog to which the user is authenticated and satisfying said search request; and the place server responsive to the URLs for building an HTML page for responding to the search result page request.

In accordance with an aspect of the invention, there is provided a computer program product configured to be operable for building a search request XML response tree from database URLs distributed across a plurality of servers.

Other features and advantages of this invention will become apparent from the following detailed description of the presently preferred embodiment of the invention, taken in conjunction with the accompanying drawings.

BEST MODE FOR CARRYING OUT THE INVENTION

In accordance with the preferred embodiments of the invention, a system and method is provided for enabling a user to search for data matching a search criteria across many projects, or places without having to access each project.

In order to address the "static URL addressing problem" resulting from having tightly coupled server location and object identifier, in accordance with the preferred embodiment of the invention there is provided a service directory for uncoupling server location and object identifiers.

Figure 1:
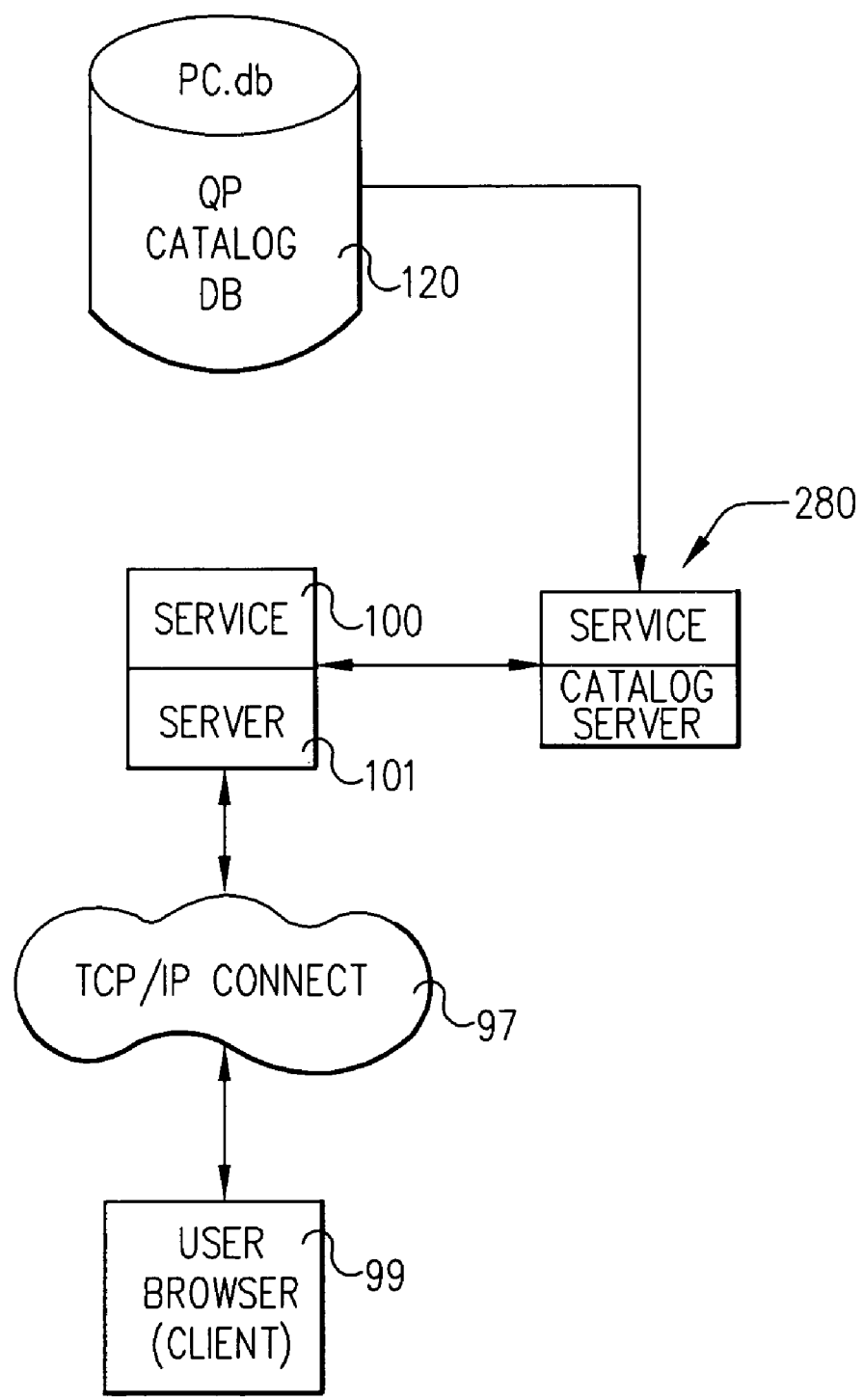
FIG. 1 is a high level system diagram illustrating a typical system configuration in accordance with the preferred embodiment of the invention.
Figure 2:
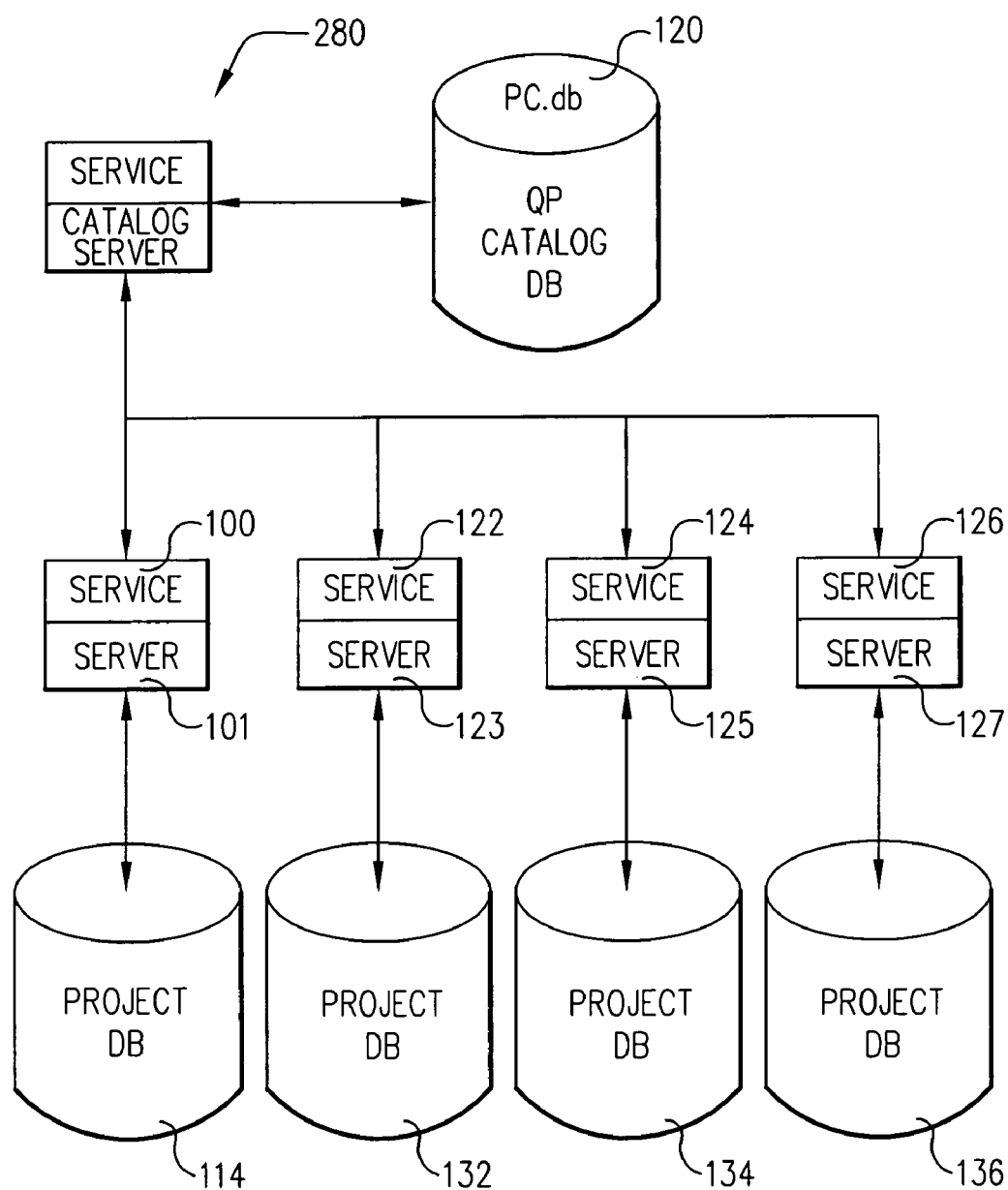
FIG. 2 is a high level system diagram illustrating a typical multi-server system environment.
Figure 3:
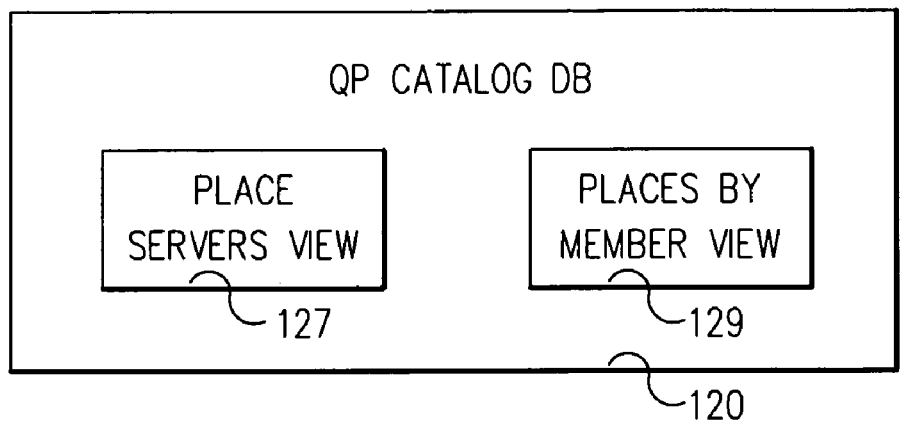
FIG. 3 is a diagram illustrating the host catalog of FIG. 1.

Referring to FIGS. 1 and 2, QuickPlace (QP) catalog database (DB) 120 (also. referred to as Place catalog database (PC.db)) is a database, such as an IBM® Lotus® QuickPlace® catalog, for aggregating information about projects, such as QuickPlaces 114, 132, 134, 136, in a multi-server system environment, including service 100/ server 101, 122/123, 124/125, and 126/127, communications link 97, and one or more client terminals, such as user browsers 99.

Throughout this specification, the generic term "project" and more specific terms "place" or "QuickPlace" are used substantially interchangeably. Place and QuickPlace, terms used primarily connection with the IBM QuickPlace and IBM Lotus Domino products, are specific examples of projects. "Places", and as used herein "projects", are databases or other entities containing searchable data to which access is controlled, such as by access control lists.

The functionality available to each user via remote terminals 99 may be customized in accordance with the needs and authorization of the user and/or entity. Terminals 99 may access the system using, for example, browser software technology or other electronic accessing methods as my be known to one of skill in the art. Reports and other information displayed to the end user at terminal 99 may be displayed using known web page formatting techniques.

Communication link 97 links remote terminals 99 to server 101. Link 97 may be a hardwired link, such as a telephone line, coaxial cable, digital data line, or the like, or a wireless link such as a radio frequency or infrared communications link, or the like.

As illustrated in FIG. 1, a QuickPlace service 100 represents a group a servers that are able to communicate with each other through a network, and work together to provide function (such as project creation, search across projects and servers, and get aggregate view across all servers and projects).

In a preferred embodiment, this service is implemented in an abstract sense, in that each server 100 implements a notion of service, which in this sense is a multi-server deployment of QuickPlace servers 101 that can be treated as a consistent unit of service for administration and in the user interface.

A QuickPlace service 100 comprises multiple QuickPlace servers 101 and/or QuickPlace clusters, which: (1) are in the same Domino domain; (2) share the same user directory and authentication system; (3) are on the same user network (i.e., are not separated by a firewall); and (4) are administered by the same administration team. These constraints are enough to ensure across the service that: (1) servers 101 can be configured consistently; (2) servers 101 can communicate and share data with each other; (3) user identities are in the same name space and do not collide; and (4) single sign on authentication can be implemented.

Figure 4:
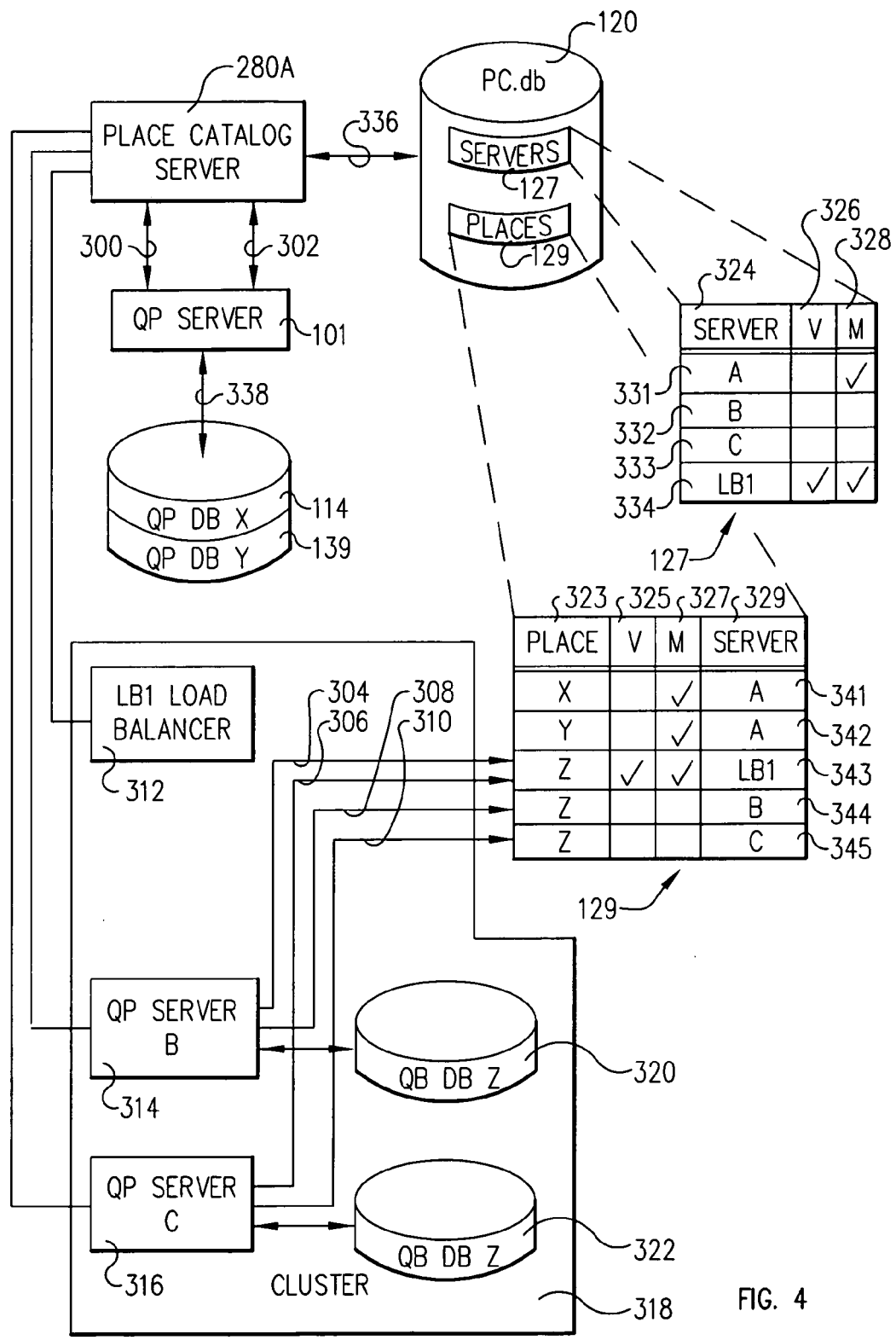
FIG. 4 is a system diagram illustrating dynamic and offline methods for aggregating information about servers and places in a multi-server environment which may include clusters.

Referring to FIG. 4, host catalog server 280A is a Domino server with QuickPlace installed which has been configured as is represented by line 336 to host, or QP catalog database 120 and which is accessible as is represented by lines 300, 302 to QuickPlace servers 101 in the enterprise through the IBM® Lotus® Notes® RPC (tcp port 1352) and http protocols. A typical project, or QuickPlace, cluster 318 includes a load balancer LBA server 312, a plurality of other servers 314, 136, and project databases 312, 322. A project cluster 318 is treated as a single virtual server in the service model.

Some entries 331–334, 341–345 are created or updated in the QP catalog database 120 in real time—the moment an event happens. Other entries are created or updated manully by a server task, or on a scheduled basis.

As is represented by lines 300, 338, is essential that certain data be sent in real time to avoid conflicts. For example, in a QuickPlace service 100 there cannot be two places 114, 139 with the same name. The creation of a new place 139 is an event that creates a new Catalog entry in real time. When a user creates a new place, QuickPlace server 101 first checks the QP catalog database 120 for that name before creating a new entry. If it finds an existing place with that name, the user is prompted to choose a different name. If the creation of a place 139 did not immediately create an entry, it would be possible for two users to successfully create two places with the same name, which would cause a conflict when QuickPlace attempted to create entries for both in the catalog 120. To increase availability of QP catalog database 120, the Domino clustering feature can be used to make several host catalog servers available (not shown).

Data can be updated in QP catalog database 120 using the QPTool placecatalog-push command or on a schedule on the QuickPlace server 101.

Host, or QP catalog database 120 contains information in servers view 127 about servers 324 and in places view 129 about places 323. Thus, in QP catalog database 120, there is an entry 331 for server A 101. For simple case aggregation, or data update, projects 114, 139 are preconfigured as is represented by line 300 to point to host catalog server 280A immediately when changes occur, or as is represented by line 302 at a particular time (say, each day at 2:00 a.m.) Immediate changes may thus be made when changes occur such as place create, place remove, place lock, change access (add/remove readers, authors, managers), and change title. Scheduled updates may be made, for example, for changes such as last modified, title, size, last accessed.

Complex aggregation is required when working with clusters.

Each entry in QP catalog database 120 has a virtual indicia entry 325, 326 and master indicia entry 328, 327. A master entry, such as entry 343, is the entry through which all access to the catalog occur for a given cluster of servers 312, 314, 316. In FIG. 4, servers 329, designated by A 101 and LB1 312 are master servers, and columns 327 and 328 are set for corresponding entries 331, 334, and 341–343.

A virtual server is a server that does not have project (aka, place) data, but knows how to connect place users to the project servers 314, 316 which do have place data 320, 322. Server LB1 312 is a virtual server because it does not have place data in a database. Project servers A 101, B 314, and C 316 are not virtual servers because they do have place data in databases X 114, Y 139, and Z 320, 322. Databases Z 320, 322 are clustered, so they are identical; a change to one is immediately replicated to the other.

Complex aggregation for clusters is done by sending immediate updates as are represented by lines 304 and 306 to master entries 334, 343. All other updates as are represented by lines 308 and 310 to the corresponding place entry 344, 345 for the respective servers B 314, C 316. For scheduled update, host place catalog server 280A executes a process to merge entries from the virtual master LBl 312 (see entry 343, which as virtual field 235 and master field 327 set) to merge entries from the virtual master entry 343 to entries 344, 345 for other servers B 314, C 316.

The Host catalog feature is enabled by the administrator creating a host Qp catalog database 120 and a configuration file.

The host QP catalog database 120 may be created by using a PlaceCatalog.ntf template to create a Notes database. The template should be found in the Domino data directory where QuickPlace is installed. Access control on the QP catalog database 120 is granted only to all the project servers 101, etc. and to administrators of the system.

The PlaceCatalog feature is configured for each server 101, etc. that interacts with the place catalog server 280A through a configuration file formatted as xml. That is, each server 101, etc. that wishes to operate with a QP catalog database 120 must have its own configuration file. The name of the file is qpconfig.xml, and is set forth in Table 1.

TABLE 1

PLACE SERVER CONFIGURATION FILE FOR CLUSTERING
(qpconfig.xml)

```
1  <?xml version="1.0" standalone="yes"?>
2  <server_settings>
3    <place_catalog_settings enabled="true">
4      <log_level>4</log_level>
5      <domino_server_name>cat1/acme</domino_server_name>
6      <nsf_filename>PlaceCatalog.nsf</nsf_filename>
7    </place_catalog_settings>
8    <cluster_settings>
9      <master virtual="true">
10        <hostname>qp.acme.com</hostname>
11     </master>
12   </cluster_settings>
13 </server_settings>
```

Cluster_settings (Table 1, lines 8–12) contains settings related to the clustering feature as it relates to the server associated with this configuration file. The PlaceCatalog feature must understand the clustering configuration so it can make the proper decisions when registering places with the Host catalog. This cluster_settings section includes the following sections:

master

In QuickPlace clustering there is a concept of a "master" server 312. It specifies which server in the cluster 318 acts as the "entry point" to a quickplace 320, 322. It can be a quickplace server or it can be a network dispatcher which acts as a "virtual" server. The following argument is available in this section:

virtual="yes"
virtual="no" (default)

which specifies if the master server is a device other than a quickplace server such as a network dispatcher or local director 312. This section includes the following sections:

hostname which specifies the hostname in tcpip format of the master server 312 in a quickplace cluster 318 (ie. qp.acme.com).

This would be the host name of a network dispatcher or local director (virtual must be "yes" above) or the hostname of a quickplace server (virtual must be "no" above)

Each time a place is created, it is registered in real-time with Host catalog server 200. This means that PlaceCatalog is configured on a QuickPlace server, then the Host catalog server must be operational for users to be able to create places.

When a QuickPlace manager adds, removes or changes a member's access level, an update is done to the QP catalog database 120 at the host.

Host QP catalog database 120 may be queried to retrieve a list of places in which a user, or one of the groups of which the user is a member, is a member.

When a user performs a search scoped to a number of quickplaces on one or more servers, the system uses a search domain server to perform the search and it also uses the Host catalog server to properly construct the URLs to the places found in the search request. For this reason, the search domain server must be configured to recognize the place catalog server 280A.

Last accessed 395 updates may be made in real time (every 1 minute) to the host QP catalog database 120.

Certain information maintained in host QP catalog database 120 may not be updated in real-time. Examples include place size 349 and the last time it was accessed 395 or modified 396. This information must be updated in batch mode. This is accomplished by running a qptool utility function "UpdatePlaceCatalog" on, for example, a daily basis. This can be automated as a Domino program entry similar to the QuickPlaceNightly tool.

When using quickplace clusters 318, the host QP catalog database 120 data is maintained for each node 312, 314, 316 in the cluster as well as for a virtual place representing the combination of all nodes if and only if a network dispatcher or local director has been configured and the proper settings reflect it in the qpconfig.xml configuration file. In this case, real-time updates to the catalog are done to the virtual place entry 343 and the non-real time updates are done to each of the cluster node entries 344, 345. This allows the administrator flexibility in knowing differences in access and size for each of the nodes in the cluster.

The last accessed time 395 updates may present a problem in large installations. For this reason, a replica of the host QP catalog database 120 may be created for each QuickPlace server.

There are two QuickPlace server cluster environment alternatives for storing QuickPlace server cluster data in QP catalog database 120.

1. If the cluster 318 does not have a virtual server 312, data is maintained in separate entries in the Host catalog 120 for each physical server 314, 316, and for each place 320, 322 on a physical server.
2. If the cluster 318 has a virtual server 312, each physical server 314, 316 and place 320, 322 has an entry 344, 345, respectively. But there is also an entry 343 for the virtual server 312 that represents the combination of all physical servers. And there is an entry for each place in the cluster that represents all the replicas of the place in the cluster. When the cluster has a virtual server 312, real-time updates to the Host catalog 120 (such as place creation, locking of a place, and place membership changes) are made in the place entries 334, 343 corresponding to the virtual server. The non-real time updates (such as place size, time last accessed, and time last modified) are made to the place entries 344, 345 corresponding to the physical servers 314, 316 in the cluster. This information allows the administrator to know the differences in access 399 and size 349 for the places 320, 322 in each of the physical servers 314, 316 in the cluster 318.

A QPTool placecatalog command with the-update flag set synchronizes the place entries 344, 345 that correspond to the physical servers 314, 316, and the place entries 343 that correspond to the virtual server 312.

To set up a virtual server 312 for a QuickPlace cluster 318, a network dispatcher is configured, such as IBM Network Dispatcher Version 3.6, with proper settings configured on each server 312, 314, 316 in the cluster 318.

Multi-Server Domain Search

Figure 5:
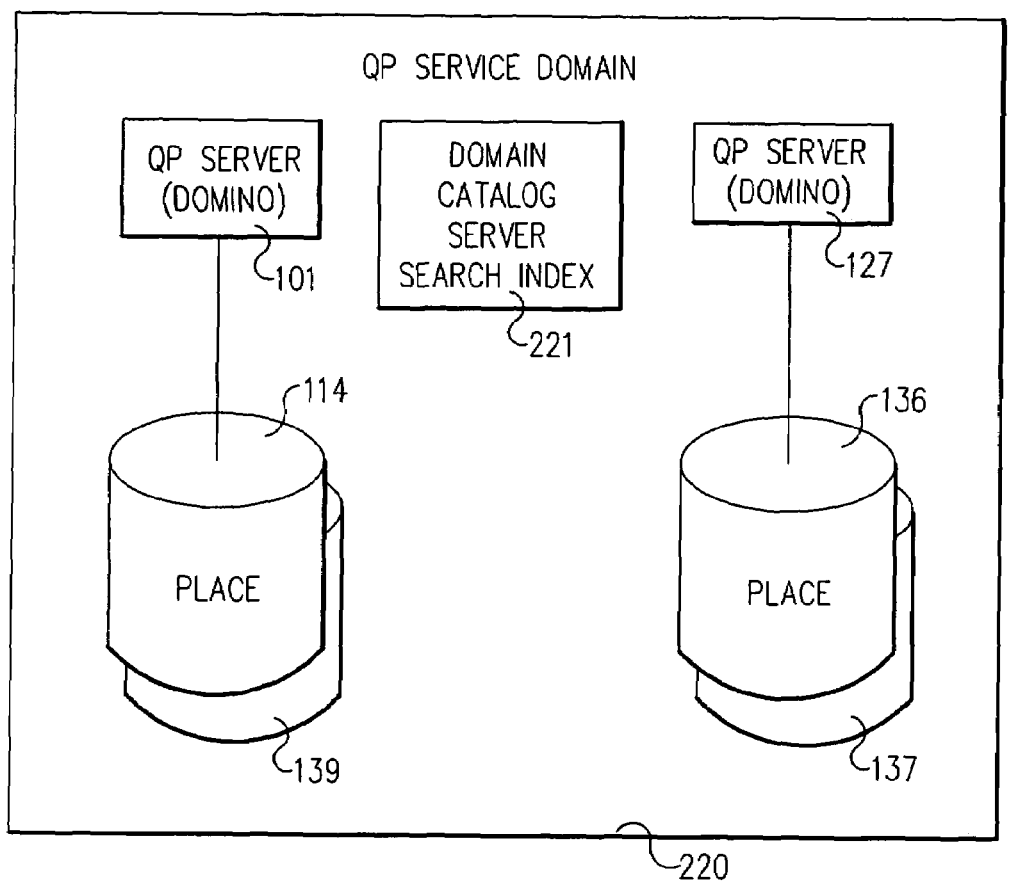
FIG. 5 is a diagrammatic representation of service domain.

Referring to FIG. 5, a search projects, or search places, facility of the present invention enables a user to search for data matching a search criteria across many projects, or places 114, 139, 136, 137 without having to access each project.

In a preferred embodiment, this search projects facility uses the Domino domain search capability. A Domino domain can include many project servers 101, 127.

Figure 6:
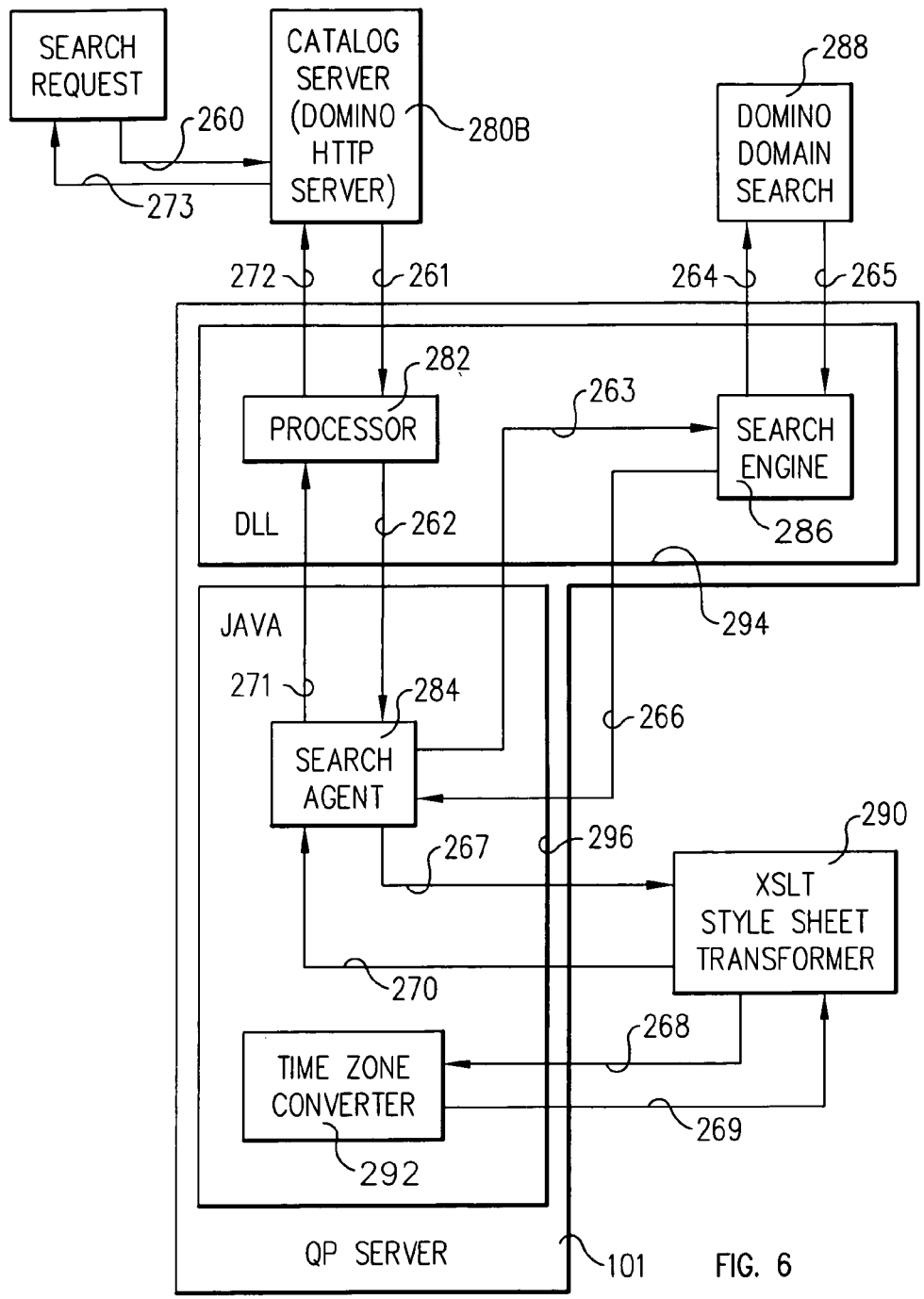
FIG. 6 is a system diagram illustrating a first exemplary embodiment of the invention.

Referring to FIG. 6, in support of multi-server domain search, a user provides a Domino catalog server 280B which includes a search index 221 to all project servers 101, 127. Tn order to generate a user interface to display results of a search, a project server 101 is installed on the catalog server 280B.

User authentication is required to search places 114, etc. By use of a Domino server multi server single sign on (msso) feature, once a user has been authenticated for access to any server 101 in a domain or service 100, 220, it has valid or authenticated access to all servers 101, 127 in that domain—which means that the user authentication is valid when accessing the domain catalog server. (The terms "domain" and "service" both refer to a plurality of project servers.)

Two interfaces provide access to the search places feature. First is through a URL. The other is through an API. URL access is used in a QuickPlace search places user interface (UI) when search places is enabled on a user's QP catalog 280 B.

A search project url request includes search criteria, information about, and the ID of, the user requesting the information, and when executed will generate a search result. When the search places facility is used from each place 114, 139, it redirects the search places UI provided by a special place on catalog server 280B, which UI collects search criteria information from a user. Search requests collected at the search places UI is handled by the domain catalog server 280B (rather than the place server 101)

Figure 8:
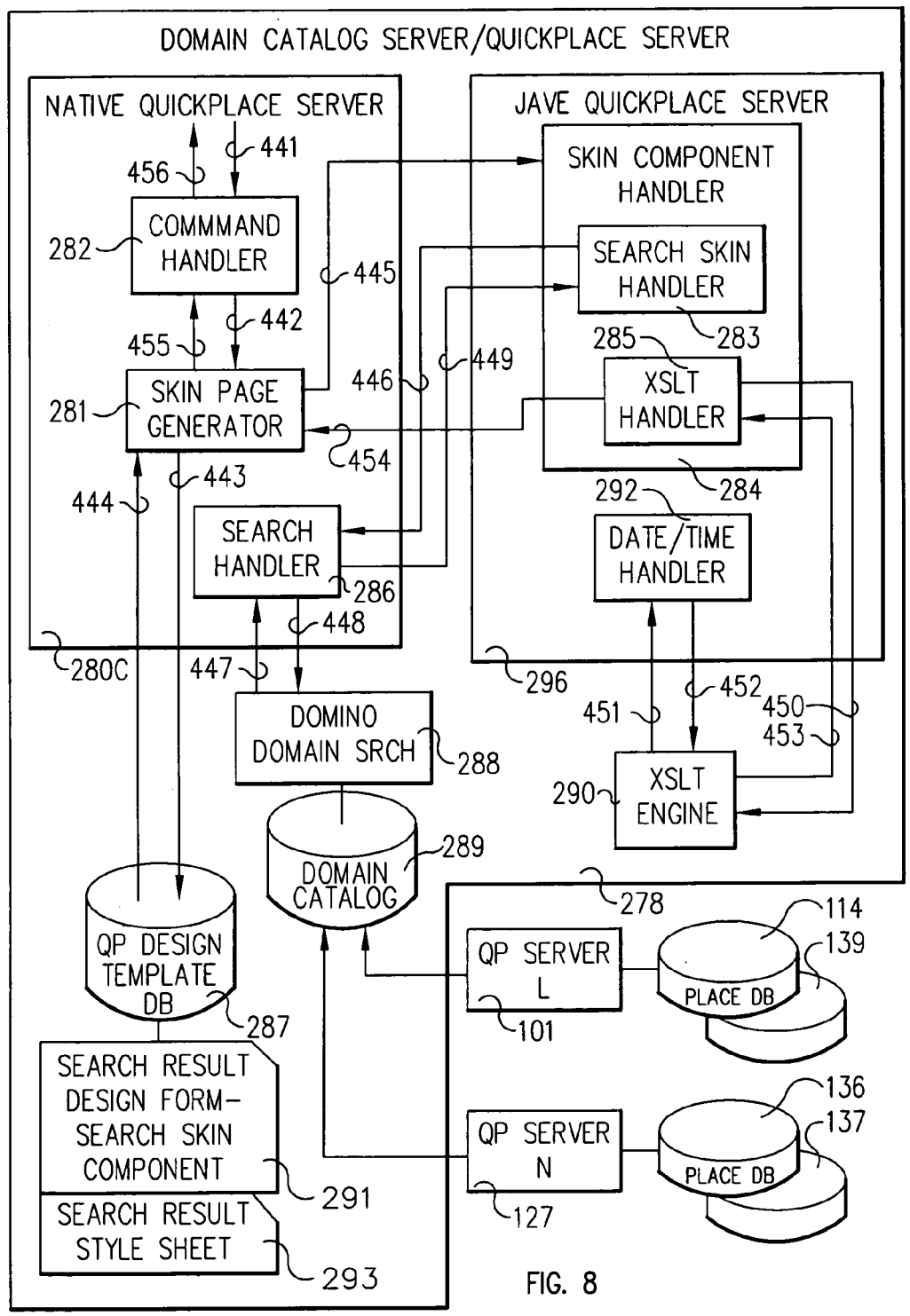
FIG. 8 is a system diagram illustrating a second exemplary embodiment of the invention.

Two similar, exemplary embodiments of the system of the invention are illustrated in FIGS. 6 and 8.

Referring to FIGS. 6 and 8, exemplary embodiments or views of the system of the invention includes a project server 101 having XSLT processor 290, DLL 294 and Java 296 components. DLL component includes processor 282 and search engine 286. Java Quickplace server, or component 296 includes skin component handler, or search agent 284, including XSLT handler 285, and time zone converter 292. Project server 101 is in communication, as is represented by lines 266, 267, with XSLT style sheet transformer, catalog server 280B and, as is represented by lines 264, 265, domain search application 288. Lines 261, 262, 263, 264, 265, 266 and 267 of FIG. 6 correspond to respective steps of the process set forth in FIG. 7A. Lines 441, 442, 443, 444, 445, 446, 447, 448, 449, 450, 451, 452, 453, 454, 455, and 456 of FIG. 8 correspond to respective steps of the process set forth in FIG. 9.

Once a Domino HTTP 280B, or equivalent, gets a request, it passes to QP server 101 the request URL and session URL handler. Processor 282 passes the URL which contains acommand identifying this as a search request to search agent 284. Search agent 284 generates an API parameter with session indicia and a search command with search criteria to Domino domain search API 288.

Figure 7A:
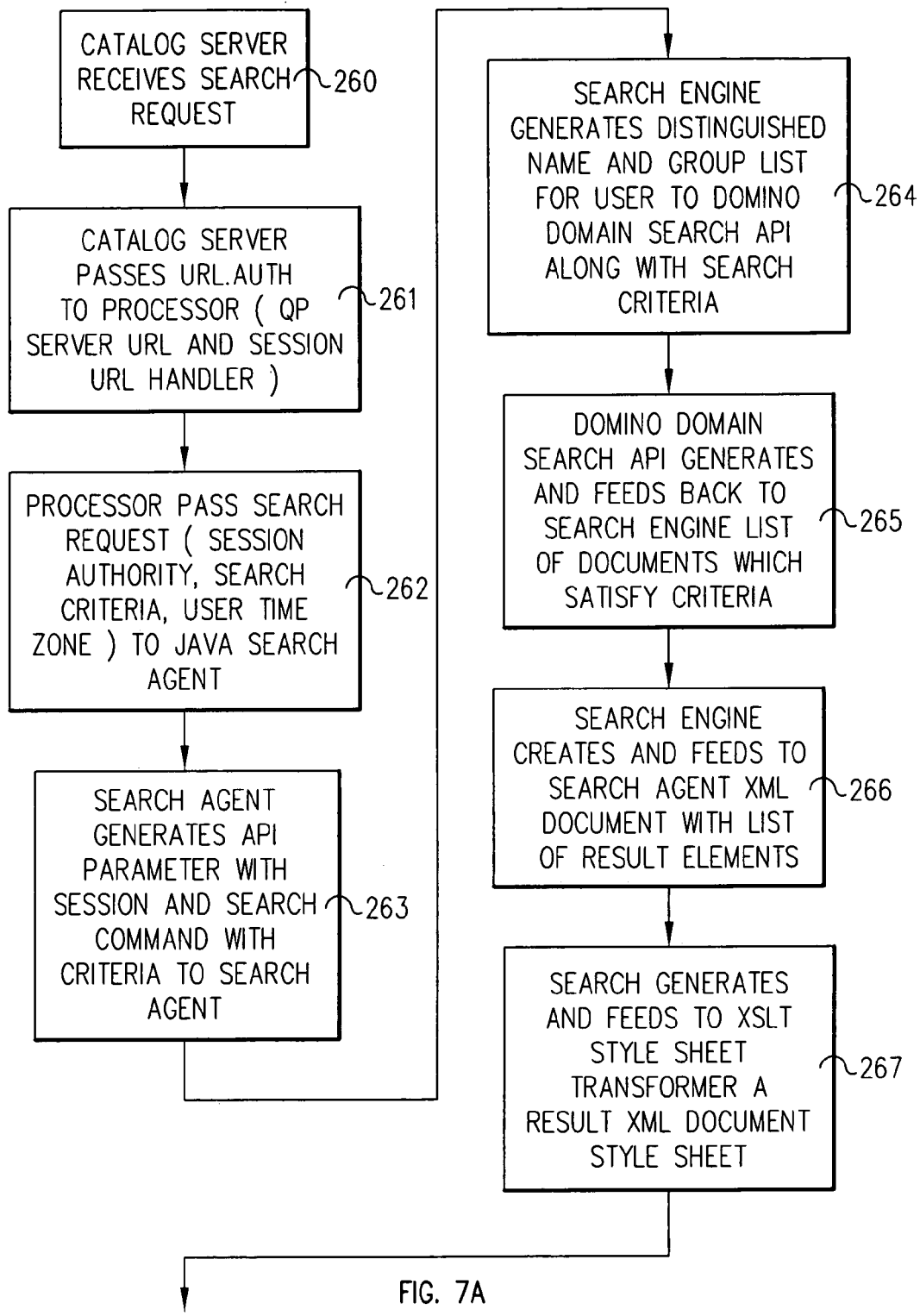
FIGS. 7A and 7B are a flow chart illustrating the method of operation of the system of FIG. 6.
Figure 7B:
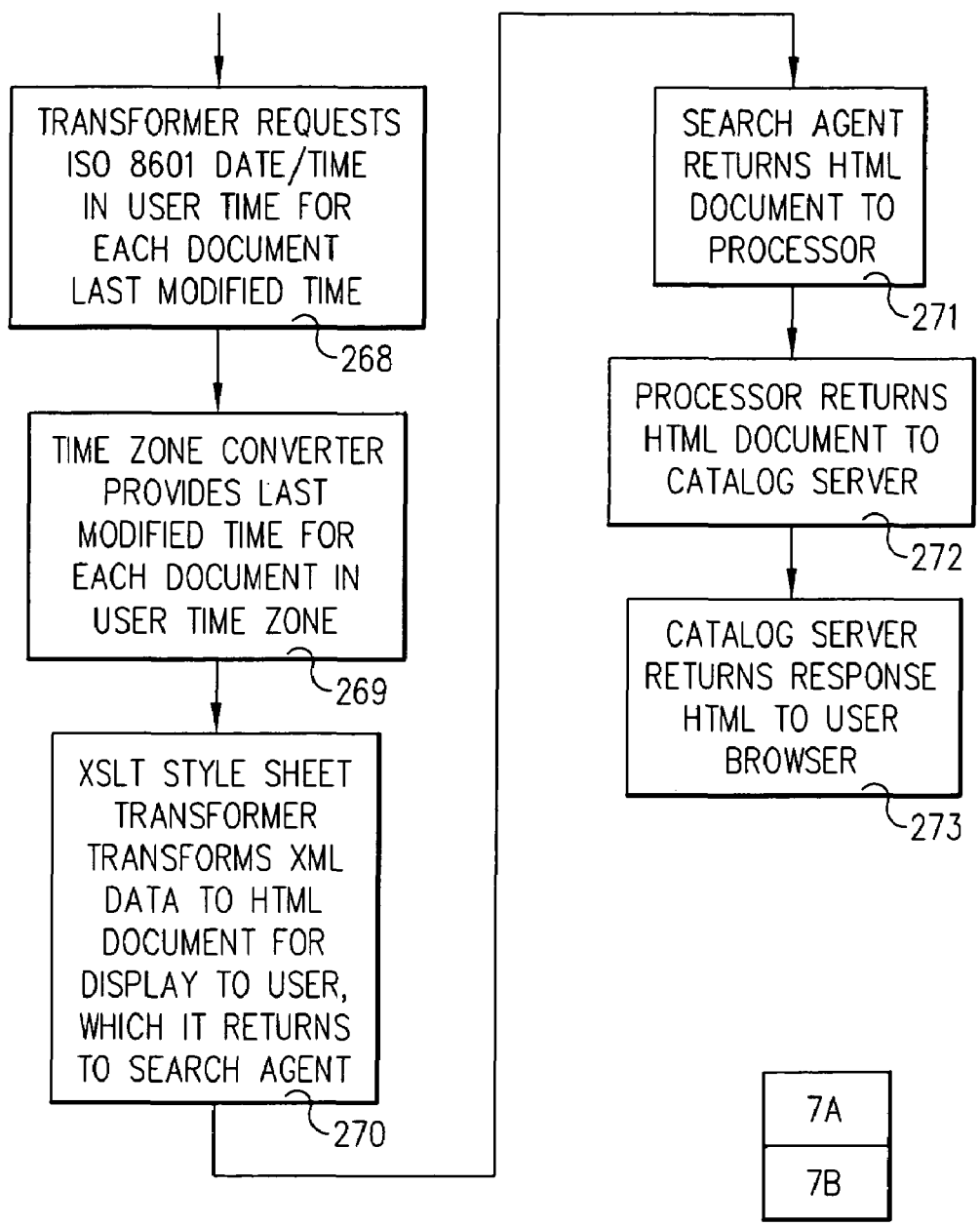

Referring to FIGS. 7A and 7B in connection with FIG. 6, in step 260 catalog 280B receives a search request which in step 261 it passes the QP server URL and session URL handler to processor 282. Tn step 262, processor 282 passes a search request (session authority, search criteria, user time zone) to Java search agent 284. In step 263, search agent 284 generates an API parameter with session and search command criteria to search engine 286. Tn step 268 XSLT style sheet transformer requests Iso 8601 date/time in user time zone for each document last modified time. In step 269 time zone converter 292 provides formatted date/time for each document in user time zone.

In step 270, XSLT style sheet transformer 290 transforms XML data to HTML document for display to user, which it returns to search agent 284. In step 271, search agent 284 returns HTML document to processor 282. In step 272 processor 282 returns HTML document to catalog server 280. In step 273 catalog server 280B returns response HTML to the user browser.

Referring to FIG. 8, another exemplary embodiment of the system of the invention provides a search places function, or cross QuickPlace search, which enables users to search documents from multiple places 114, 139, 136, 137 where the user has access. The system includes a Server 278 includes a native QuickPlace server 280C, Java QuickPlace server 296, a QuickPlace design template database 287, an XSLT engine 290, and Domino domain search module 288 including a Domino domain catalog 289. Domino domain search 288 is able to find documents from multiple Domino databases 114, 139, 186, 137 at servers 101, 127 in Domino domain based on a user's access rights. In order to maintain users' credentials across multiple places 114, 139, 136, 137 on multiple servers 101, 127, single-sign on is required for QuickPlace authentication.

A user may be an individual user and a user that belongs to one or more groups. Consequently, distinguished name and group lists for this user are provided to the Domino domain search 288. Domino domain search 288 generates a list of documents satisfying the search criteria, which is fed back to search engine 286 which then creates an XML document with a list of result elements. The XML document is fed to search agent 284, which feeds the result XML document along with an XML style sheet to XSLT style sheet transformer 290. It then transforms XML data to an HTML document for display to the user. Each document contains last modified time in Greenwich mean time (gmt) which must be converted to the user's time zone by converter 292.

Before search places may be used, a server administrator configures Domino domain search 288 for QuickPlace service, which is a set of QuickPlace servers 101, 127 cataloged in this embodiment in a Domino domain catalog 289.

Figure 9:
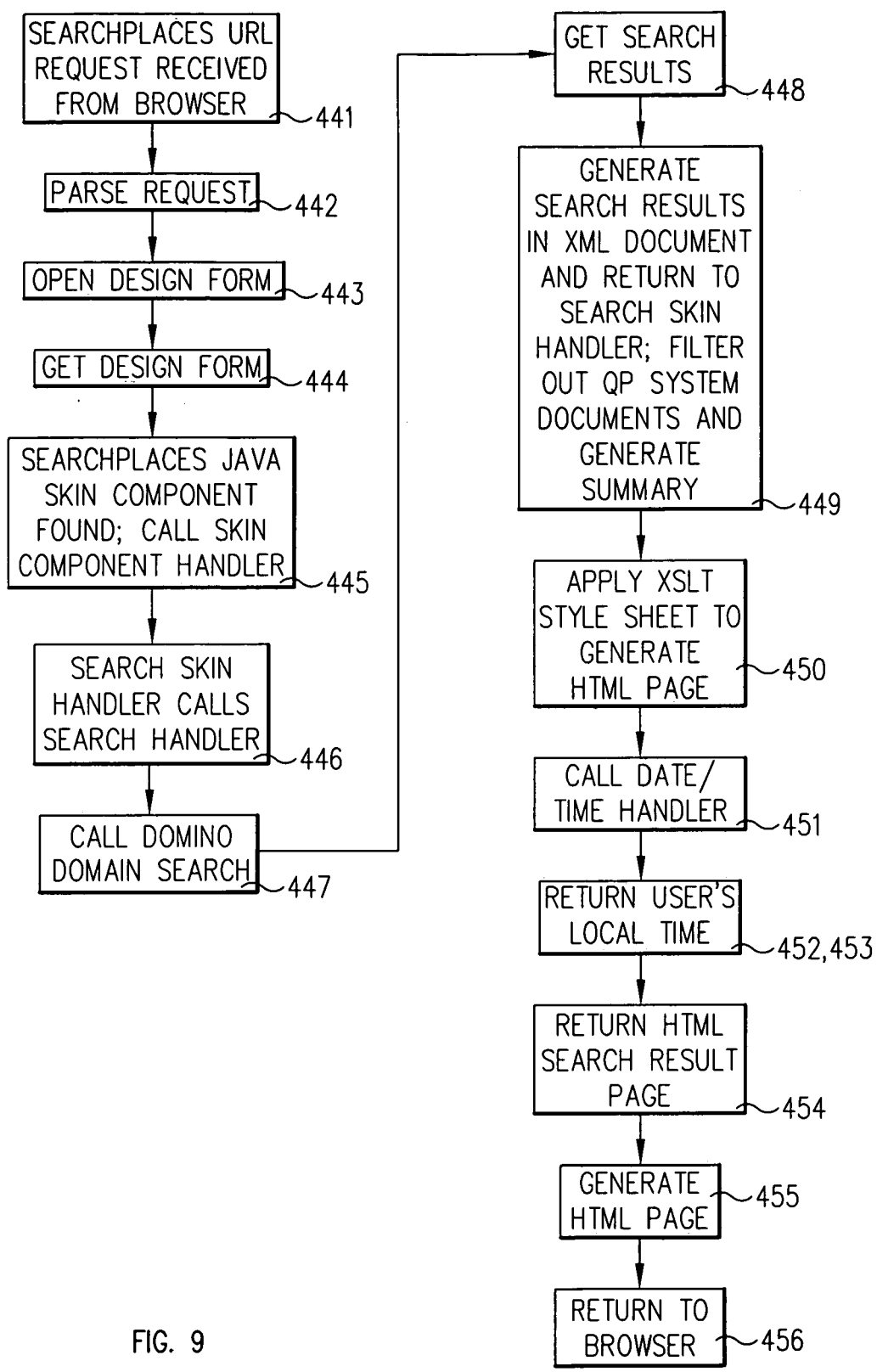
FIG. 9 is a flow chart illustrating the method of operation of the system of FIG. 8.

Referring to FIG. 9 in connection with FIG. 8, in step 441 the search places function is initiated on this server 280C by receiving a search places URL request, which includes a URL and a session indicia from a user browser. In step 442, command handler 282 parses the request to determine the URL and session. In step 443, design template database 287 is opened to obtain a search result design form. In step 444 the design form is returned, including search skin component 291 and search result style sheet 293.

In step 445, skin page generator 281 finds a search places Java skin component 291 in the design form received from design template database 287, and calls Java skin component handler 284, passing in the call the URL, session and XSLT stylesheet 293.

In step 446, search skin handler 283 calls C++ search handler 286 with search criteria, property and user name. In step 447, Domino domain search 288 is called with search criteria, property and user name. In step 448, search results are received [referred to as search result notes].

In step 449, a result XML document tree is generated with the search results and returned to Java search skin handler 283. In order to filter out QuickPlace system documents and generate a summary, each result document is examined In step 450, XSLT stylesheet 293 specified in search skin component 291 is applied to generate an HTML page including the result XML document and XSLT.

In step 451, ISO-8601 date/time handler 292 specified in XSLT stylesheet 293 is called to convert date information in ISO-8601 date/time format to user's local time, given as date/time and user's time zone from result tree of Step 449.

In steps 452, 543, the user's local time is returned.

In step 454 the HTML search result page is returned. In step a whole HTML page is generated by assembling other parts of the page. An in step 456, the result is returned to the user's browser.

To support multi-server domain search, the path part of a search request URL, including protocol, server and port, is constructed according to information stored in a central place directory 221 keyed by place. By specifying a load balance server, such as LB1 312, instead of accessing QuickPlace servers, such as 314, 316, server load may be distributed among several QuickPlace servers 314, 316.

Generating URL from Domain Search Result

Search results are returned from Domino domain search 288 in the form of list of database IDs, Note ID and server name hint. Search places dynamically generates URL of each result document by using central place catalog 120 as follows:
1. Obtain place database file name path from database 120, including place ID and server.
2. Extract place name from place database file name path. e.g. QuickPlace\[placename]\PageLibraryXXXXX.nsf
3. Query place catalog 120 by place name to determine the access method of the place. Access method includes protocol (http or https), server name, prefix (reverse proxy) and port number.
4. Retrieve folder view and unid of the document from db id and note id. If no view is assigned for the document, use the search index 221 view as folder view.
   https://qpdcs.ibm.com:8080/QuickPlace/placename/ dbname/folderview/unid/?OpenDocument Domino Domain search 288 returns result as specific document on specific Domino server. Referring to FIG. 4, by using place catalog 120, URL is generated using main server 312 of the place 320, 322 instead of the server 314, 316 of where document were found. Thus, an http request to the document returned from database Z 320, 322 can be balanced by load balancer 312, such as LB1 312 in cluster 318. The reverse proxy server can be specified as URL path too.

Also, by having a dedicated QuickPlace server 312 for indexing and replicating all places within a service, domain catalog server 278 can create search index against this dedicated server 312 so that other QuickPlace servers 314, 316 will not be affected by indexing performance degradation. Even so, the URLs to the result documents are distributed to servers 101, 314, 316 in domain or service 220.

SearchPlaces Search Criteria Parameters for Search by URL

When search places processes a search request, the search criteria and properties, passed by the search request URL 260, are translated to a search query string 262 for domain search. Search criteria and properties are encoded in the URL as illustrated in the example of Table 2.

TABLE 2

SEARCH CRITERIA URL EXAMPLE

| | |
|---|---|
| 1 | http://<hostname>/QuickPlace/<quickplace>/Main.nsf/h_To |
| 2 | c/ $new/?EditDocument |
| 3 | &Form=h_PageUI |
| 4 | &PreSetFields= |
| 5 | h_EditAction;h_New, |
| 6 | h_SetReadScene;h_StdPageRead, |
| 7 | h_SetEditScene;h_CrossQPSearchResults, |
| 8 | h_ReturnToPage;<UNID>, |
| 9 | &Query=<search string>, |
| 10 | &SearchDate=<search date>, |
| 11 | &SearchDateType=<serach date type>, |
| 12 | &SearchOrder=<search order>, |
| 13 | &Count=<search count>, |
| 14 | &Start=<search start>, |
| 15 | &QueryType=<search type> |

In the example of Table 2,

| | |
|---|---|
| "preset fields" | specifies the scene transition and form to generate the search result page. |
| "query" | specifies the text string for the search, encoded by the JavaScript escape() function. |
| "SearchDate" | (default:null) is the date string for the created or modified date. |
| "SearchDateType" | is h_Before, h_After, h_SearchDate, or h_On. |
| "Search order" | specifies 'by relevance', 'by oldest date first', or 'by newest date first'. |
| "Count" | is the number of results to be listed in a result page. |
| "Start" | specifies the first result number to be listed at the top of a result page. |
| "Query type" | is an ORed search for given words, an AND search for given words, or exact for exact match only. |

SearchPlaces Search Criteria Parameters for Search by API

A SearchPlaces API uses XML documents for input and uses common entry points for QuickPlace services.

Class com.lotus.quickplace.ap.QPAPI static void process(Node session, Node root) throws Exception Process action(s) in XML document is given by root and uses session as session of processing document. The session XML document is as follows:

```
<?xml version="1.0"?>
<session>
    <person>
        <dn>
            CN=Ken Hirata, O=khirata
        </dn>
    </person>
</session>
```

To conduct a search, a user specifies the search action in the service node of a root XML document, as follows:

```
<?xml version="1.0"?>
<service action="search">
    <query start="0" count="15" order="score">
        <!(CDATA("IIS" & ($UpdatedBy) contains
        "hirata"))>
    </query>
</service>
```

Where start is first number of search result for paging, count is number of results to retrieve, order is "score" for relevance, "asc" and "desc" for ascendant date and descendant date respectively, and query is a CDATA section node.

Table 3 is an example result document for the above search.

TABLE 3

EXAMPLE XML RESULT DOCUMENT

```
1   <?xml version="1.0" encoding="ISO-8859-1"
2   standalone="no"?>
3   <!DOCTYPE searchResults SYSTEM "searchResults.dtd">
4   <?xml-stylesheet type="text/sxl" href=
5   "CrossQuickPlaceSearchResult.xsl"?>
6   <searchResults>
7       <searchRequest start="0" count="20= sort="relevance">
8           <user>
9               <cn>cn=Ken Hirata/OU=khirata</dn> <!-- DN of
10              user -->
11          </user>
12          <criteria>
13              <string type="any">IIS test</string> <!--
14              Search string -->
15              <authorString>ken</authorString><!--entered
16              author name,can be substring-->
17              <modified type="after">
18                  <datetime>2000-8-IT00:00:00</datetime>
19              </modified>
20          </criteria>
21      </searchRequest>
22      <searchResult seqnum="1">
23          <document>
24              <name>TITLE</name><!--h_name or
25              "sidHaikuSearchUntitled"-->
26              <author>AUTHOR</author> <!-- h_AlternateName
27              otherwise h_Originator (not DN) -->
28              <url>URL</url><!-- href for result document--
29              >
30              <abstrat>ABSTRACT</abstract><!--Abstract
31              string-->
32              <lastModified>
33                  <datetime>DATETIME</datetime><!-- ISO-
34                  8601 extended dategime format -->
35              </lastModified>
36          </document>
37          <quickplace>
38              <name>QuickPlace name</name>
39          </quickplace>
40          <relevance>RELEVANCE</relevance><!-- Relevance value
```

TABLE 3-continued

EXAMPLE XML RESULT DOCUMENT

```
41      returned from FT -->
42      </searchResult>
43      <searchResult seqnum="n">
44      </searchResult>
45  </searchResults>
```

In QuickPlace, a QP system document is stored as a normal document in a Domino database. Domino domain search may find QP system documents in the result set. In this example, as there is no way to distinguish in the search criteria QP system documents from user documents, the result set needs to be purged of system documents.

Configuration

In addition to the Domino domain search configuration, SearchPlaces needs to be configured, such as in the following sample qpconfig.xml file:

```
<search_places enabled="true" log_level="0"
anonymous="true">
    <domain_catalog_server ssl="false">
        <port>80</port>
        <domino_server_name>
            qpdocs/Haiku
        </domino_server_name>
        <path_prefix></path_prefix>
        <hostname>qpdcs.ibm.com</hostname>
    </domain_catalog_server>
</search_places>
```

Generating URL from Domain Search Result

Search results are returned from a Domino domain search in the form of a list of database IDs, note IDs and server name hints. Search places dynamically generates the URL of each result document by using a central place catalog 120 by (1) obtaining place database file name path from database ID and server hint; (2) extracting the place name from the place database file name path; (3) querying to the place catalog by place name to obtain the access method of the place, which access method includes protocol (http or https), server name, prefix (reverse proxy) and port number; and (4) retrieving the folder view and unid of the document from the database ID and note ID. If no view is assigned for the document, the index view is used as the folder view.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for searching a plurality of project databases, comprising:
   configuring a service to include a plurality of project servers, a domain catalog server, a domain catalog, and a domain catalog server search index;
   authenticating a user for access to said service;
   receiving a search request from a user;
   with reference to said domain catalog, executing a domain search for documents satisfying said search request in all databases within said service to which said user is authenticated;
   building an XML document tree of URLs to said documents satisfying said search request; and
   deriving from said XML document tree and returning to said user a list of document URLs satisfying said search request.

2. The method of claim 1, further comprising:
   enabling said domain search on said user's project server including providing a domain search user interface; and
   receiving said search request via said user interface.

3. The method of claim 1, further comprising providing an API for receiving said search requests from said user as XML documents.

4. The method of claim 1, further comprising:
   obtaining from a design template database a search result design form including a search skin component and search result style sheet;
   building said XML document tree of URLs by applying said style sheet to said documents satisfying said search request.

5. The method of claim 1, further comprising executing multi server single signon for authenticating said user for access to all project servers in said domain.

6. The method of claim 1, further comprising purging system documents from said XML document tree.

7. The method of claim 1, further comprising converting time of last update indicia in said search results to user time zone.

8. The method of claim 1, further comprising configuring a plurality of said servers in a cluster including a load balancer server, a plurality of other servers and corresponding project databases treated as a single virtual server in a service model.

9. The method of claim 1, further comprising:
   configuring a main place server for indexing and replicating all places within a service;
   said domain catalog server building and maintaining said search index against said main place server; and
   distributing URLs to result documents to said project servers in said domain.

10. The method of claim 4, further comprising including a search criteria section and a document section for each document in said XML response document.

11. A system for searching a plurality of project databases, comprising:
   a plurality of project databases;
   a service including plurality of project database servers;
   a server signon processor for authenticating access by a user to a plurality of said project databases;
   a domain catalog server including a native server, a place server and a domain catalog;
   said native server for receiving from said user a search result page request and accessing said domain catalog with respect to said search request to obtain URLs for a plurality of documents in said project databases served by project servers configured to said domain catalog to which said user is authenticated and satisfying said search request; and
   said place server responsive to said URLs for building an HTML page for responding to said search result page request.

12. The system of claim 11, further comprising:
   design template database for storing search result design forms including search skin components and corresponding search result style sheets;
   said native server further for accessing said design template database for a search skin component for said search request; and
   said place server further responsive to said search skin component for building a query for said native server to access said domain catalog and to said style sheets for generating said XML result tree.

13. The system of claim 11, said place server further comprising a date/time handler for converting mean time to user time zone.

14. A system for searching a plurality of project databases, comprising:
   means for configuring a service to include a plurality of project servers, a domain catalog server, a domain catalog, and a domain catalog server search index;
   means for authenticating a user for access to said service;
   means for receiving a search request from a user;
   means for with reference to said domain catalog, executing a domain search for documents satisfying said search request in all databases within said service to which said user is authenticated;
   means for building an XML document tree of URLs to said documents satisfying said search request; and
   means for deriving from said XML document tree and returning to said user a list of document IDs satisfying said search request.

15. A program storage device readable by a machine, comprising volatile and/or non-volatile storage, tangibly embodying a program of instructions executed by a machine to perform method steps for searching a plurality of project databases, said method comprising:
   configuring a service to include a plurality of project servers, a domain catalog server, a domain catalog, and a domain catalog server search index;
   authenticating a user for access to said service;
   receiving a search request from a user;
   with reference to said domain catalog, executing a domain search for documents satisfying said search request in all databases within said service to which said user is authenticated;
   building an XML document tree of LTRLs to said documents satisfying said search request; and
   deriving from said XML document tree and returning to said user a list of document Ids satisfying said search request.

16. A computer program product for searching a plurality of project databases, comprising:
- a computer readable medium comprising volatile and/or non-volatile storage;
- first program instructions for configuring a service to include a plurality of project servers, a domain catalog server, a domain catalog, and a domain catalog server search index;
- second program instructions for authenticating a user for access to said service;
- third program instructions for receiving a search request from a user;
- fourth program instructions for executing, with reference to said domain catalog, a domain search for documents satisfying said search request in all databases within said service to which said user is authenticated;
- fifth program instructions for building an XML document tree of URLs to said documents satisfying said search request; and
- sixth program instructions for deriving from said XML document tree and returning to said user a list of document Ids satisfying said search request; and wherein
- said first, second, third, fourth, fifth, and sixth program instructions are recorded on said computer readable medium.

* * * * *